(12) United States Patent
Han et al.

(10) Patent No.: US 9,019,448 B2
(45) Date of Patent: Apr. 28, 2015

(54) DISPLAY APPARATUS HAVING IMPROVED OUTDOOR VISIBILITY

(75) Inventors: Moon-gyu Han, Yongin-si (KR); Hong-seok Lee, Seongnam-si (KR); Chang-gyun Shin, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 293 days.

(21) Appl. No.: 13/016,155

(22) Filed: Jan. 28, 2011

(65) Prior Publication Data

US 2012/0044443 A1 Feb. 23, 2012

(30) Foreign Application Priority Data

Aug. 19, 2010 (KR) .................. 10-2010-0080413

(51) Int. Cl.
*G02F 1/1335* (2006.01)
*F21V 8/00* (2006.01)

(52) U.S. Cl.
CPC .......... *G02F 1/133621* (2013.01); *G02B 6/005* (2013.01); *G02F 2202/32* (2013.01)

(58) Field of Classification Search
USPC ............. 349/65, 68, 106, 108, 113, 114
See application file for complete search history.

(56) References Cited

U.S. PATENT DOCUMENTS

| 7,145,614 | B2 * | 12/2006 | Lee et al. ............. 349/106 |
| 7,462,873 | B2 * | 12/2008 | Hoshi et al. .......... 257/88 |
| 2004/0135944 | A1 | 7/2004 | Kim |
| 2009/0034051 | A1 | 2/2009 | Arsenault et al. |
| 2009/0190072 | A1 * | 7/2009 | Nagata et al. ........ 349/96 |

FOREIGN PATENT DOCUMENTS

| JP | 2009-128823 | 6/2009 |
| KR | 10 2004-0011621 | 2/2004 |
| KR | 10 2004-0100002 | 12/2004 |

\* cited by examiner

*Primary Examiner* — Lucy Chien
*Assistant Examiner* — Paisley L Arendt
(74) *Attorney, Agent, or Firm* — NSIP Law

(57) ABSTRACT

A display apparatus includes a light guide plate to emit light that enters through a side surface of the light guide plate through an upper surface of the light guide plate, a light source arranged on at least one side of the light guide plate, a reflection plate arranged under the light guide plate, a color filter layer arranged above the light guide plate, and an optical shutter arranged above the color filter layer to transmit or block at least a part of light according to electric control, wherein the color filter layer includes a transmission type color filter to transmit light in a particular wavelength band and reflect light in other wavelength bands.

20 Claims, 7 Drawing Sheets though a side surface of the light guide plate through an upper surface of the light guide plate, a light source arranged on at least one side of the light guide plate, a reflection plate arranged under the light guide plate, a color filter layer arranged above the light guide plate, and an optical shutter arranged above the color filter layer to transmit or block at least a part of light according to electric control, wherein the color filter layer may include a transmission type color filter to transmit light in a particular wavelength band and reflect light in other wavelength bands.

DISPLAY APPARATUS HAVING IMPROVED OUTDOOR VISIBILITY

CROSS-REFERENCE TO RELATED APPLICATIONS

This application claims the benefit under 35 U.S.C. §119 (a) of Korean Patent Application No. 10-2010-0080413, filed on Aug. 19, 2010, in the Korean Intellectual Property Office, the entire disclosure of which is incorporated herein by reference for all purposes.

BACKGROUND

1. Field

The following description relates to a display apparatus having improved outdoor visibility. The present disclosure relates to a display apparatus that is switchable between a reflection mode and a transmission mode, and more particularly, to a display apparatus that may be operated in a reflection mode in strong outdoor light or in a transmission mode in low outdoor light, by using a color filter capable of wavelength-selectively transmitting or reflecting light.

2. Description of the Related Art

With the recent development of communications technologies and display devices, various kinds of mobile terminals such as mobile phones, personal digital assistants (PDAs), and mini notebook computers have been widely distributed. The mobile terminals may be characteristically used without restriction in many places, such as in strong outdoor light when not directly under the sun.

However, when a mobile terminal is used in strong outdoor light, visibility of a display apparatus may be deteriorated. In order to prevent such deterioration, brightness of the display apparatus may be increased. Although the simplest way to increase the brightness is to increase the output power of the display apparatus, power consumption of the mobile terminal increases accordingly. Since the power consumption of the mobile terminal is desired to be small in consideration of mobility, the method is difficult to adopt.

Furthermore, it is difficult for a transmission type display apparatus such as a liquid crystal display (LCD) to simultaneously have superior outdoor visibility and minimum power consumption, due to a limit in a structure thereof. For example, a conventional pigment-based color filter generally used for a transmission type display apparatus transmits light of a particular wavelength band only and absorbs light of other wavelength bands. Accordingly, about 60%-70% of light is lost by the color filter. To manufacture a color filter having higher color purity, a thickness of a color filter is increased and thus light transmissivity of a color filter may be further lowered.

In the meantime, a reflection/transmission switchable display apparatus has been suggested, wherein the reflection/transmission switchable display apparatus operates as a reflection type display in outdoor light by turning a backlight off and utilizing outdoor light, and as a transmission type display in low outdoor light by turning the backlight on and using the backlight. The display apparatus capable of switching between a reflection mode and a transmission mode may minimize consumption of power and increase outdoor visibility. However, in the suggested reflection/transmission switchable display apparatus, an area for a reflection mode and an area for a transmission mode are separately provided in a single pixel. Thus, since one pixel is divided into two areas, resolution in each of the transmission mode and the reflection mode is lowered. Also, maximum brightness may not be obtained in both of the transmission mode and the reflection mode.

SUMMARY

Provided are display apparatuses having superior outdoor visibility in strong outdoor light.

Also provided are display apparatuses that may operate in a reflection mode in strong outdoor light or in a transmission mode in low outdoor light.

Additional aspects will be set forth in part in the description which follows and, in part, will be apparent from the description, or may be learned by practice of the described and/or other example embodiments.

The foregoing and/or other features and aspects may be achieved by providing a display apparatus including a light guide plate to emit light that enters through a side surface of the light guide plate through an upper surface of the light guide plate, a light source arranged on at least one side of the light guide plate, a reflection plate arranged under the light guide plate, a color filter layer arranged above the light guide plate, and an optical shutter arranged above the color filter layer to transmit or block at least a part of light according to electric control, wherein the color filter layer may include a transmission type color filter to transmit light in a particular wavelength band and reflect light in other wavelength bands.

The color filter layer may include a first transmission type color filter to trasmit only blue light and reflect red light and green light, a second transmission type color filter to transmit only the green light and reflect the red light and the blue light, and a third transmission type color filter to transmit only the red light and reflect the green light and the blue light.

The color filter layer may include a plurality of first through third transmission type color filters repeatedly arranged.

The optical shutter may include a plurality of pixels corresponding to the plurality of first through third transmission type color filters.

The plurality of first through third transmission type color filters may be formed of photonic crystals in which two types of materials having different refractive indexes are periodically arranged.

A thickness of each of a plurality of layers of each of the two materials and a periodicity of the two materials of the photonic crystals may vary for each of the plurality of first through third transmission type color filters.

The optical shutter may include a liquid crystal (LC).

The reflection plate may reflect light reflected by the color filter layer toward the light guide plate.

The foregoing and/or other features and aspects may also be achieved by providing a display apparatus including a light guide plate to emit light that enters through a side surface of the light guide plate through an upper surface of the light guide plate, a light source arranged on at least one side of the light guide plate, a reflection plate arranged under the light guide plate, a color filter layer arranged above the light guide plate; and an optical shutter arranged above the color filter layer to transmit or block at least a part of light according to electric control, wherein the color filter layer may include a reflection type color filter to reflect light in a particular wavelength band and transmit light in other wavelength bands.

The color filter layer may sequentially include a first color filter layer sequentially including a second reflection type color filter, a first reflection type color filter, and a third reflection type color filter, an optical switching layer arranged on the first color filter layer, and a second color filter layer arranged on the optical switching layer and sequentially including the first reflection type color filter, the third reflection type color filter, and the second reflection color filter.

The first reflection type color filter may reflect only blue light and may transmit red light and green light, the second reflection type color filter may reflect only the green light and may transmit the red light and the blue light, and the third reflection type color filter may reflect only the red light and may transmit the green light and the blue light.

The first color filter layer may include a plurality of the first through third reflection type color filters repeatedly arranged in an order of the second reflection type color filter, the first reflection type color filter, and the third reflection color filter, and the second color filter layer may include a plurality of the first through third reflection type color filters repeatedly arranged in an order of the first reflection type color filter, the third reflection type color filter, and the second reflection color filter.

The second reflection type color filter of the first color filter layer may be arranged to face the first reflection type color filter of the second color filter layer, the first reflection type color filter of the first color filter layer may be arranged to face the third reflection type color filter of the second color filter layer, and the third reflection type color filter of the first color filter layer may be arranged to face the second reflection type color filter of the second color filter layer.

The optical switching layer arranged between the first color filter layer and the second color filter layer may be configured to switch between a transparent state to transmit light and a black state to block light.

The display apparatus may be switchable between a transmission mode in which an image is formed by transmitting light provided by the light source and a reflection mode in which an image is formed by reflecting outdoor light, and the optical switching layer may be controlled into the transparent state so that the display apparatus may operate in the transmission mode and the optical switching layer may be controlled into the black state so that the display apparatus may operate in the reflection mode.

The reflection plate may reflect light reflected by the first and second color filter layers toward the light guide plate.

The optical switching layer may be any one of a liquid crystal based shutter, an electrochromic element, and an electrowetting device.

The first through third reflection type color filters may be formed of photonic crystals in which two types of materials having different refractive indexes are periodically arranged.

A thickness of each of a plurality of layers of each of the two materials and a periodicity of the two materials of the photonic crystals may vary for each of the first through third reflection type color filters.

The optical shutter may include a plurality of pixels corresponding to the first through third reflection type color filters of the second color filter layer.

The optical shutter may include a liquid crystal (LC).

BRIEF DESCRIPTION OF THE DRAWINGS

These and/or other aspects will become apparent and more readily appreciated from the following description of various example embodiments, taken in conjunction with the accompanying drawings of which.

DETAILED DESCRIPTION

Figure 1A:
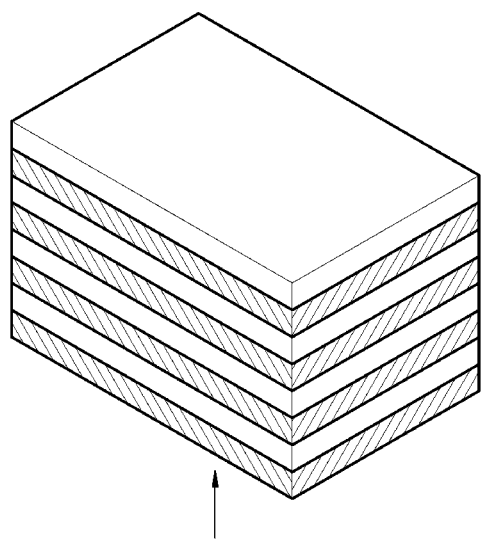
FIGS. 1A-1C schematically illustrate various structures of general photonic crystals.

Reference will now be made in greater detail to various example embodiments, examples of which are illustrated in the accompanying drawings, wherein like reference numerals refer to the like elements throughout. In this regard, the discussed example embodiments may have different forms and should not be construed as being limited to the descriptions set forth herein. Accordingly, the example embodiments are merely described below, by referring to the figures, to explain various aspects of the present description.

As described above, since a pigment-based color filter transmits light of only a particular wavelength band and absorbs light of other remaining wavelength bands, a light use efficiency of a display apparatus including such a color filter may be relatively low. If a color filter can reflect, and not absorb, light of wavelength bands other than a transmission wavelength band, a light use efficiency of a display apparatus including such a color filter may be improved by reusing the reflected light.

A photonic crystal may be used as a material having the above optical characteristic. A photonic crystal in which two sorts of materials having different dielectric constants, that is, a refractive index, are periodically arranged may have a characteristic of transmitting, reflecting, or absorbing nearly 100% of light in a particular wavelength band. A wavelength band of light that is not transmitted by a photonic crystal is referred to as a photonic bandgap. Accordingly, a photonic crystal may be referred to as a photonic bandgap material due to such a characteristic. A photonic bandgap is a concept similar to an electronic band gap in a semiconductor. As semiconductor technologies have been developed using electronic band gaps, it is expected that a photonic bandgap may be variously applied. A material having a photonic bandgap structure using a photonic crystal may be applied to a variety of fields including filters, high efficient LEDs, optical switches, low-loss optical waveguides, oscillators, high reflection mirrors, and so on. Especially, when a photonic crystal is used as a color filter, a color filter exhibiting superior wavelength selectivity and easy adjustment of a color bandwidth may be obtained.

Figure 1B:
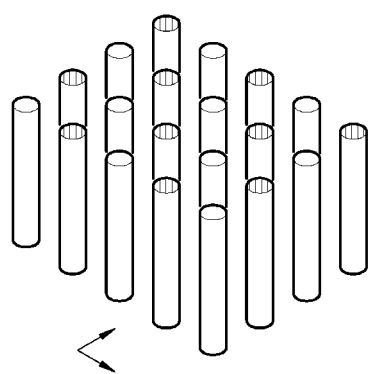
Figure 1C:
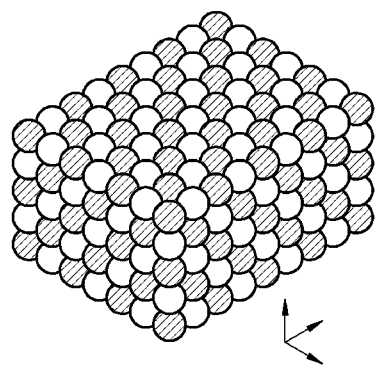

Photonic crystals are classified as 1D, 2D, or 3D photonic crystals according to a direction of periodicity of a structure of the photonic crystals. For example, as illustrated in FIG. 1A, a photonic crystal having periodicity in only one direction indicated by an arrow is a 1D photonic crystal. The photonic crystal of FIG. 1A has an intrinsic optical characteristic in only the direction indicated by the arrow. Also, as illustrated in FIG. 1B, a photonic crystal having periodicity in two directions indicated by arrows is a 2D photonic crystal. The photonic crystal of FIG. 1B has an intrinsic optical characteristic in the two directions indicated by the arrows. Also, as illustrated in FIG. 1C, a photonic crystal having periodicity in three directions indicated by arrows is a 3D photonic crystal. The photonic crystal of FIG. 1C has an intrinsic optical characteristic in the three directions indicated by the arrows.

The following description suggests using a photonic crystal having the above-described characteristics as a color filter of a display apparatus to improve a light use efficiency of the display apparatus. In an example in which such a photonic crystal is used as a color filter, one of two types of color filters may be required according to a type of a display apparatus to be embodied. For example, for a transmission type display apparatus using a backlight, a transmission type color filter for transmitting light of a desired wavelength band and reflecting light of remaining wavelength bands may be needed. Also, for a reflection type display apparatus using outdoor light, a reflection type color filter for reflecting light of a desired wavelength band and transmitting light of remaining wavelength bands may be needed.

As described above, an optical characteristic of a photonic crystal may be determined according to a periodic structure of the photonic crystal and refractive indexes of two materials constituting the photonic crystal. Thus, a structure of a photonic crystal needs to be appropriately designed to embody a color filter having a desired characteristic. Since a design of such a photonic crystal is well known in the technical field to which this description pertains, a detailed description of a photonic crystal structure will be omitted herein. The following description will focus on examples of a display apparatus using a photonic crystal designed to have a desired characteristic as a color filter.

Figure 2:
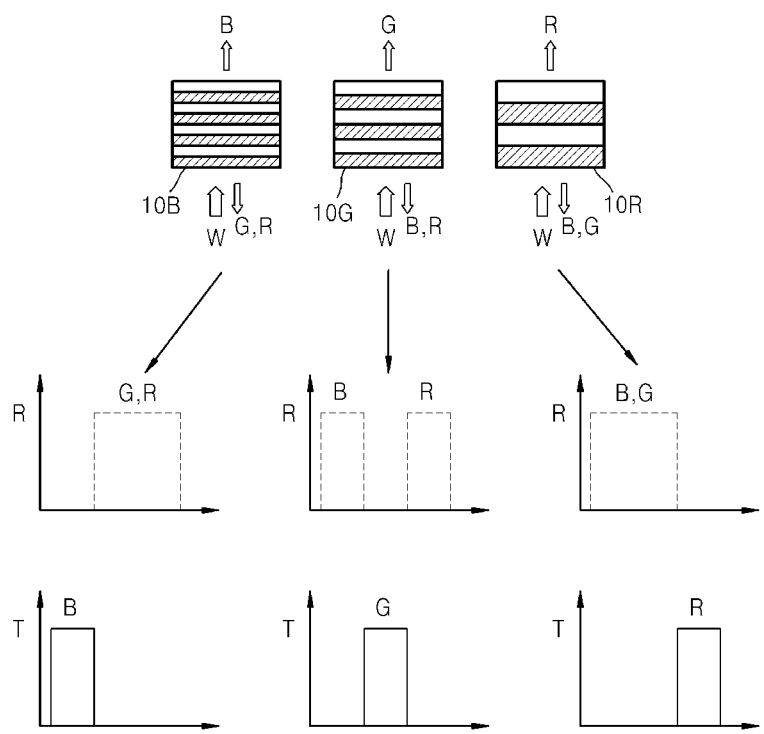
FIG. 2 schematically illustrates an optical characteristic of a transmission type photonic crystal color filter.

First, FIG. 2 schematically illustrates an optical characteristic of a transmission type photonic crystal color filter. Referring to FIG. 2, a first transmission type photonic crystal color filter 10B may have a characteristic of transmitting only blue light B of white incident light W and reflecting red light R and green light G. A second transmission type photonic crystal color filter 10G may have a characteristic of transmitting only the green light G of the white incident light W and reflecting the red light R and the blue light B. A third transmission type photonic crystal color filter 10R may have a characteristic of transmitting only the red light R of the white incident light W and reflecting the green light G and the blue light B. The first through third transmission type photonic crystal color filters 10B, 10G, and 10R may be formed of photonic crystals obtained by periodically arranging two materials having different refractive indexes. A thickness of each layer of each of the two materials and a periodicity of the two materials may vary according to the optical characteristics of the first through third transmission type photonic crystal color filters 10B, 10G, and 10R. The graphs of FIG. 2 illustrate which colors are transmitted and which colors are reflected in the first through third transmission type photonic crystal color filters 10B, 10G, and 10R. While the examples illustrated in FIG. 2 have three different type phototonic crystal color filters B, G, and R, it is understood that these configurations are not limited to either this number of colors or these specific colors.

Figure 3:
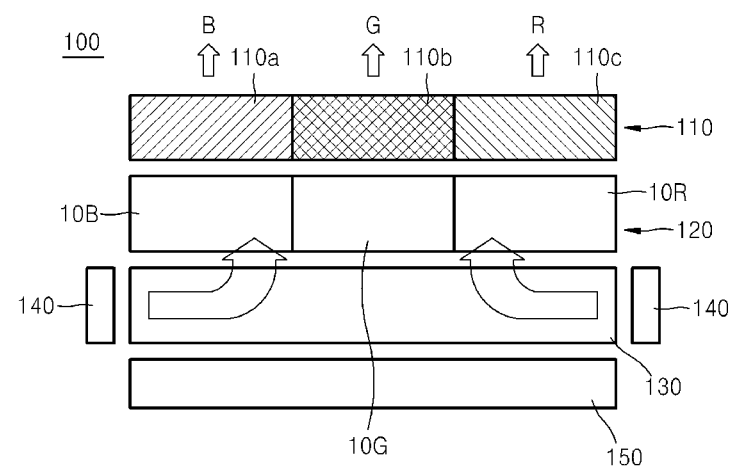
FIG. 3 schematically illustrates a structure of a transmission type display apparatus according to an example embodiment, using the transmission type photonic crystal color filter of FIG. 2.

FIG. 3 schematically illustrates a structure of a transmission type display apparatus 100 according to an example embodiment, using the first through third transmission type photonic crystal color filters 10B, 10G, and 10R of FIG. 2. Referring to FIG. 3, the transmission type display apparatus 100 may include a light guide plate 130, a light source 140 arranged on sides of the light guide plate 130, a reflection plate 150 arranged under the light guide plate 130, a color filter layer 120 arranged above the light guide plate 130, and an optical shutter 110 arranged above the color filter layer 120.

The light guide plate 130, the light source 140, and the reflection plate 150 may constitute a backlight unit. The light source 140 may provide white incident light W to the light guide plate 130. To this end, the light source 140 may be a light source that emits white light by itself, such as a cold cathode fluorescent lamp (CCFL), or include three different light sources, for example, light emitting diodes (LEDs) that respectively emit red light, green light, and blue light. Also, although FIG. 3 illustrates the light source 140 being arranged on both sides of the light guide plate 130, the light source 140 may be arranged only on one side thereof. The white incident light W provided by the light source 140 may be totally reflected in the light guide plate 130 and proceed through the light guide plate 130. In doing so, part of the white incident light W may exit through an upper surface of the light guide plate 130. Although it is not illustrated in detail in the drawings, a fine structure, for example, a holographic pattern, to discharge light outwardly may be formed on the upper surface of the light guide plate 130.

The color filter layer 120 may include the first through third transmission type photonic crystal color filters 10B, 10G, and 10R of FIG. 2. For example, the color filter layer 120 may be configured by repeatedly arranging a plurality of the transmission type photonic crystal color filters 10B, 10G, and 10R. The optical shutter 110 arranged above the color filter layer 120 may transmit or block all or at least a part of light according to, for example, electric control. For example, a liquid crystal (LC) may be used as the optical shutter 110. The optical shutter 110 may include a plurality of pixels 110$a$, 110$b$, and 110$c$ respectively corresponding to the first through third transmission type photonic crystal color filters 10B, 10G, and 10R.

In the above-described structure, white incident light W passing through the light guide plate 130 may be incident on each of the first through third transmission type photonic crystal color filters 10B, 10G, and 10R. Then, for example, only blue light B of the white incident light W is transmitted through the first transmission type photonic crystal color filter 10B, whereas red light R and green light G are reflected by the first transmission type photonic crystal color filter 10B and input back to the light guide plate 130. Also, only the green light G of the white incident light W is transmitted through the second transmission type photonic crystal color filter 10G, whereas the red light R and the blue light B are reflected by the second transmission type photonic crystal color filter 10G and input back to the light guide plate 130. Also, only the red light R of the white incident light W is transmitted through the third transmission type photonic crystal color filter 10R, whereas the blue light B and the green light G are reflected by the third transmission type photonic crystal color filter 10R and input back to the light guide plate 130. The light passing through the first through third transmission type photonic crystal color filters 10B, 10G, and 10R may form an image through the pixels 110$a$, 110$b$, and 110$c$ of the optical shutter 110.

Meanwhile, the light reflected by the first through third transmission type photonic crystal color filters 10B, 10G, and 10R passes through the light guide plate 130 and is reflected again by the reflection plate 150 arranged under the light guide plate 130. Then, the light is incident again on the light guide plate 130 and passes through the light guide plate 130 by being totally reflected. In doing so, the light may exit through the upper surface of the light guide plate 130. The light through the upper surface of the light guide plate 130 is incident again on the first through third transmission type photonic crystal color filters 10B, 10G, and 10R of the color filter layer 120.

According to the present example embodiment, since the optical path of the light incident on the first through third transmission type photonic crystal color filters 10B, 10G, and 10R is changed due to the light guide plate 130 and the reflection plate 150, the light is incident on different color filters from the ones on which the light was originally incident. Accordingly, the light is likely to pass through the first through third transmission type photonic crystal color filters 10B, 10G, and 10R.

As a result, the light reflected by the first through third transmission type photonic crystal color filters 10B, 10G, and 10R is not lost and may contribute to formation of an image by being reused. Therefore, the display apparatus 100 of FIG. 3 may have a relatively high light use efficiency. Also, the display apparatus 100 may obtain higher brightness with less consumption of power and have superior outdoor visibility, due to its high light use efficiency. Furthermore, since the first through third transmission type photonic crystal color filters 10B, 10G, and 10R exhibit superior wavelength selectivity, the display apparatus 100 may provide an image with high color purity.

Figure 4:
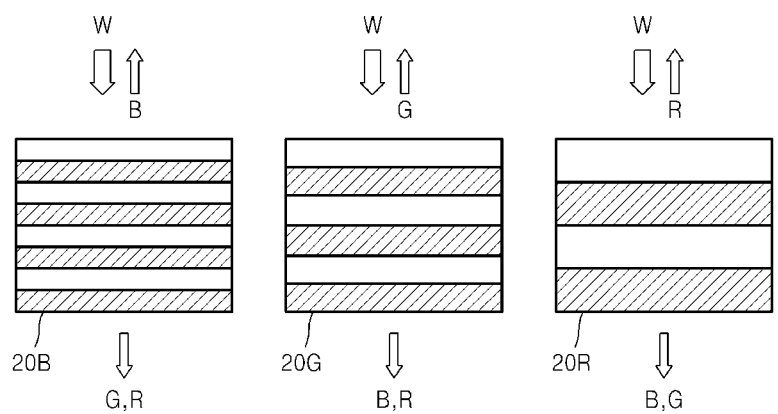
FIG. 4 schematically illustrates an optical characteristic of a reflection type photonic crystal color filter.

Meanwhile, photonic crystal color filters may be manufactured to be a reflection type instead of the transmission type. FIG. 4 schematically illustrates an example of a reflection type photonic crystal color filter and an optical characteristic thereof. Referring to FIG. 4, a first reflection type photonic crystal color filter 20B may have a characteristic of reflecting only blue light B of white incident light W and transmitting red light R and green light G. A second reflection type photonic crystal color filter 20G may have a characteristic of reflecting only the green light G of the white incident light W and transmitting the red light R and the blue light B. A third reflection type photonic crystal color filter 20R may have a characteristic of reflecting only the red light R of the white incident light W and transmitting the green light G and the blue light B.

Figure 5A:
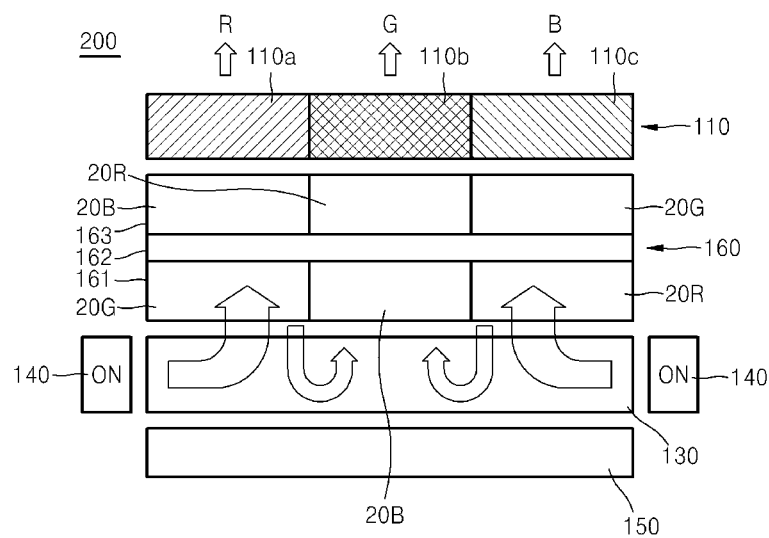
FIGS. 5A and 5B schematically illustrate a structure and operation of a reflection/transmission switchable display apparatus according to an example embodiment, using a dual layer color filter obtained by combining the reflection type photonic crystal color filter of FIG. 4 in a double layer.
Figure 5B:
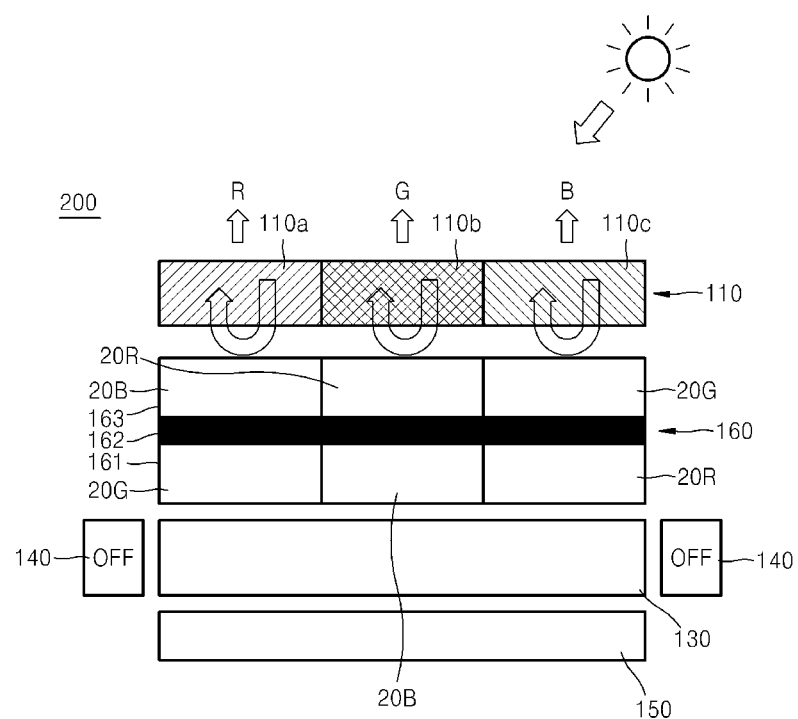

A display apparatus capable of switching between a reflection mode and a transmission mode may be provided by using the first through third reflection type photonic crystal color filters 20B, 20G, and 20R having the above characteristics. FIGS. 5A and 5B schematically illustrate a structure and operation of a reflection/transmission switchable display apparatus 200 according to an example embodiment. The reflection/transmission switchable display apparatus 200 uses a dual layer color filter obtained by combining the first through third reflection type photonic crystal color filters 20B, 20G, and 20R of FIG. 4 in a double layer. FIG. 5A illustrates an example of the reflection/transmission switchable display apparatus 200 operating in a transmission mode. FIG. 5B illustrates an example of the reflection/transmission switchable display apparatus 200 operating in a reflection mode.

First, referring to FIG. 5A, the reflection/transmission switchable display apparatus 200 may include the light guide plate 130, the light source 140 arranged on both sides of the light guide plate 130, the reflection plate 150 arranged under the light guide plate 130, a color filter layer 160 arranged above the light guide plate 130, and the optical shutter 110 arranged above the color filter layer 160. Since the light guide plate 130, the light source 140, the reflection plate 150, and the optical shutter 110 are already described above with reference to FIG. 3, no further descriptions thereon will be made herein.

The color filter layer 160 may include a dual layer color filter in which the first through third reflection type photonic crystal color filters 20B, 20G, and 20R of FIG. 4 are combined in a double layer. For example, referring to FIG. 5A, the color filter layer 160 may include a first color filter layer 161, an optical switching layer 162 arranged on the first color filter 161, and a second color filter layer 163 arranged on the optical switching layer 162. In the first color filter layer 161, the first through third reflection type photonic crystal color filters 20B, 20G, and 20R are repeatedly arranged in the following order: the second reflection type photonic crystal color filter 20G, the first reflection type photonic crystal color filter 20B, and then the third reflection type photonic crystal color filter 20R. In the second color filter layer 163, the first through third reflection type photonic crystal color filters 20B, 20G, and 20R are repeatedly arranged in the following order: the first reflection type photonic crystal color filter 20B, the third reflection type photonic crystal color filter 20R, and then the second reflection type photonic crystal color filter 20G.

That is, the second reflection type photonic crystal color filter 20G of the first color filter layer 161 is arranged to correspond to the first reflection type photonic crystal color filter 20B of the second color filter layer 163. The first reflection type photonic crystal color filter 20B of the first color filter layer 161 is arranged to correspond to the third reflection type photonic crystal color filter 20R of the second color filter layer 163. The third reflection type photonic crystal color filter 20R of the first color filter layer 161 is arranged to correspond to the second reflection type photonic crystal color filter 20G of the second color filter layer 163.

The optical switching layer 162 between the first color filter layer 161 and the second color filter layer 163 may be controlled into a transparent state so that the display apparatus 200 may operate in a transmission mode to transmit light or into a black state so that the display apparatus 200 may operate in a reflection mode to block light. For example, an LC based shutter, an electrochromic element, an electrowetting device, or the like may be used as the optical switching layer 162.

In the above-described structure, when the display apparatus 200 operates in the transmission mode, as illustrated in FIG. 5A, the light source 140 is turned on and provides white light to the light guide plate 130. The light switching layer 162 is controlled into the transparent state in which light is transmitted. Then, the white light emitted through the upper surface of the light guide plate 130 is incident on the color filter layer 160 having the above-described dual layer color filter structure.

Figure 6:
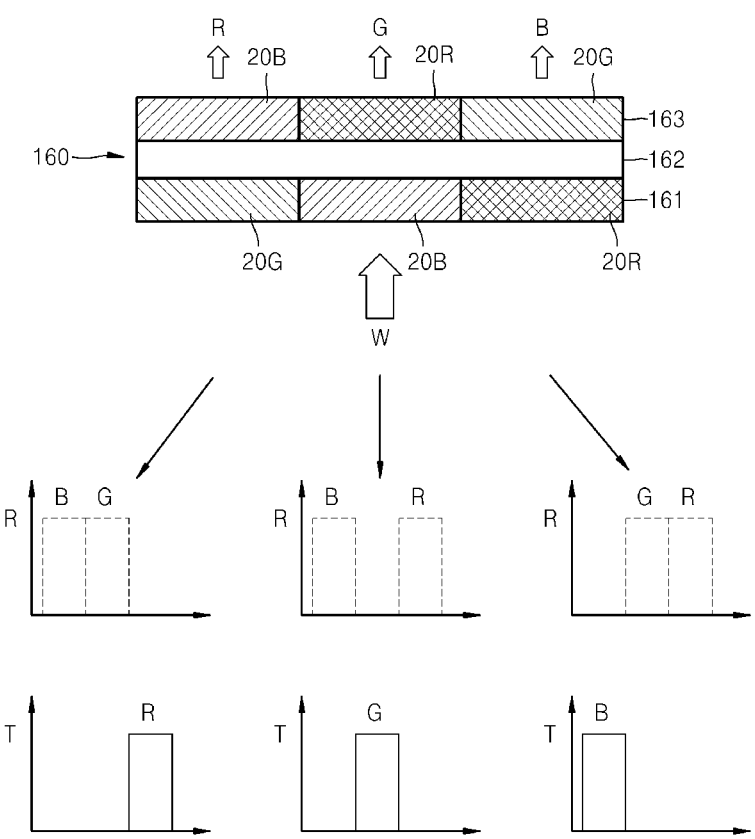
FIG. 6 schematically illustrates an optical characteristic of a dual layer color filter obtained by combining the reflection type photonic crystal color filter of FIG. 4 in a dual layer used as a transmission type.

As illustrated in FIG. 6, only red light R is transmitted through a portion where the second reflection type photonic crystal color filter 20G of the first color filter layer 161 is overlapped with the first reflection type photonic crystal color filter 20B of the second color filter layer 163. Also, only green light G is transmitted through a portion where the first reflection type photonic crystal color filter 20B of the first color filter layer 161 is overlapped with the third reflection type photonic crystal color filter 20R of the second color filter layer 163. Also, only blue light B is transmitted through a portion where the third reflection type photonic crystal color filter 20R of the first color filter layer 161 is overlapped with the second reflection type photonic crystal color filter 20G of the second color filter layer 163. The graphs of FIG. 6 illustrate which colors are transmitted and which colors are reflected in the color filter layer 160. The light transmitted through the color filter layer 160 may form an image through the pixels 110a, 110b, and 110c of the optical shutter 110.

The green light G is reflected from the second reflection type photonic crystal color filter 20G of the first color filter layer 161 and proceeds toward the reflection plate 150. Also, the blue light B of the light transmitted through the second reflection type photonic crystal color filter 20G of the first color filter layer 161 is reflected by the first reflection type photonic crystal color filter 20B of the second color filter layer 163. Then, the blue light B is transmitted through the second reflection type photonic crystal color filter 20G of the first color filter layer 161 and proceeds toward the reflection plate 150. As a result, the light reflected by the first color filter layer 161 of the color filter layer 160 and the light reflected by the second color filter layer 163 are all reflected by the reflection plate 150 and then reused to form an image. Thus, the display apparatus 200 of FIG. 5A may have a relatively high light use efficiency in the transmission mode.

The display apparatus 200 according to the present example may display an image by using outdoor light, instead of a backlight, in strong outdoor light such as sunlight. FIG. 5B illustrates an example in which the display apparatus 200 operates in the reflection mode. When the display apparatus 200 operates in the reflection mode, as illustrated in FIG. 5B, the light source 140 may be turned off and may no longer provide white light. The light switching layer 162 may be controlled into the black state in which no light is transmitted. The outdoor light passes through each of the pixels 110a, 110b, and 110c and is incident on the second color filter layer 163 of the color filter layer 160. For example, only blue light B of the outdoor light incident on the first reflection type photonic crystal color filter 20B of the second color filter layer 163 is reflected, whereas light of other colors are transmitted through the first reflection type photonic crystal color filter 20B and absorbed by the optical switching layer 162. Likewise, only red light R of the outdoor light incident on the third reflection type photonic crystal color filter 20R of the second color filter layer 163 is reflected, whereas light of other colors are transmitted through the third reflection type photonic crystal color filter 20R and absorbed by the optical switching layer 162. In addition, only green light G of the outdoor light incident on the second reflection type photonic crystal color filter 20G of the second color filter layer 163 is reflected, whereas light of other colors are transmitted through the second reflection type photonic crystal color filter 20G and absorbed by the optical switching layer 162. In this manner, the light reflected by the second color filter layer 163 passes through each of the pixels 110a, 110b, and 110c and emitted to the outside, thereby contributing to the formation of an image.

As described above, the display apparatus 200 according to the present example embodiment may be switched between a transmission mode and a reflection mode in a simple method. Also, since there is no need to split a pixel into two regions for switching between the transmission mode and the reflection mode, resolution and brightness may not be lowered.

In the above description, various examples of a display apparatus that is switchable between a reflection mode and a transmission mode has been described and illustrated. It should be understood that the various example embodiments described therein should be considered in a descriptive sense only and not for purposes of limitation. Descriptions of features or aspects within each embodiment should typically be considered as available for other similar features or aspects in other example embodiments.

A number of example embodiments have been described above. Nevertheless, it will be understood that various modifications may be made. For example, suitable results may be achieved if the described techniques are performed in a different order and/or if components in a described system, architecture, or device are combined in a different manner and/or replaced or supplemented by other components or their equivalents. Accordingly, other implementations are within the scope of the following claims.

What is claimed is:

1. A display apparatus comprising:
a light guide plate to emit light that enters through a side surface of the light guide plate through an upper surface of the light guide plate;
a light source arranged on at least one side of the light guide plate;
a reflection plate arranged under the light guide plate;
a color filter layer arranged above the light guide plate; and
an optical shutter arranged above the color filter layer to transmit or block at least a part of light according to electric control,
wherein the color filter layer comprises:
a first color filter layer sequentially comprising a second reflection type color filter, a first reflection type color filter, and a third reflection type color filter;
an optical switching layer arranged on the first color filter layer; and
a second color filter layer arranged on the optical switching layer and sequentially comprising the first reflection type color filter, the third reflection type color filter, and the second reflection color filter,
wherein the display apparatus is configured to switch between a transmission mode in which an image is formed by transmitting light provided by the light source and a reflection mode in which an image is formed by reflecting outdoor light, and
the optical switching layer is configured to switch between a transparent state so that the display apparatus operates in the transmission mode by providing white light to the light guide plate and a black state so that the display apparatus operates in the reflection mode wherein the light source is turned off and no light is transmitted.

2. The display apparatus of claim 1, wherein the first reflection type color filter reflects only blue light and transmits red light and green light, the second reflection type color filter reflects only the green light and transmits the red light and the blue light, and the third reflection type color filter reflects only the red light and transmits the green light and the blue light.

3. The display apparatus of claim 1, wherein the first color filter layer comprises the first through third reflection type color filters repeatedly arranged in an order of the second reflection type color filter, the first reflection type color filter, and the third reflection color filter, and
the second color filter layer comprises the first through third reflection type color filters repeatedly arranged in an order of the first reflection type color filter, the third reflection type color filter, and the second reflection color filter.

4. The display apparatus of claim 1, wherein the second reflection type color filter of the first color filter layer is arranged to face the first reflection type color filter of the second color filter layer, the first reflection type color filter of the first color filter layer is arranged to face the third reflection type color filter of the second color filter layer, and the third reflection type color filter of the first color filter layer is arranged to face the second reflection type color filter of the second color filter layer.

5. The display apparatus of claim 1, wherein the reflection plate reflects light reflected by the first and second color filter layers toward the light guide plate.

6. The display apparatus of claim 1, wherein the optical switching layer is any one of a liquid crystal based shutter, an electrochromic element, and an electrowetting device.

7. The display apparatus of claim 1, wherein the first through third reflection type color filters are formed of photonic crystals in which two types of materials having different refractive indexes are periodically arranged.

8. The display apparatus of claim 7, wherein a thickness of each of layers of each of the two materials and a periodicity of the two materials of the photonic crystals vary for each of the first through third reflection type color filters.

9. The display apparatus of claim 1, wherein the optical shutter comprises pixels corresponding to the first through third reflection type color filters of the second color filter layer.

10. The display apparatus of claim 1, wherein the optical shutter comprises a liquid crystal (LC).

11. The display apparatus of claim 9, wherein when the display apparatus operates in the reflection mode, light reflected by the second color filter layer passes through each of the pixels and is emitted to the outside.

12. The display apparatus of claim 9, wherein when the display apparatus operates in the reflection mode, only blue light of the outdoor light incident on the first reflection type color filter of the second color filter layer is reflected, whereas light of other colors are transmitted through the first reflection type color filter and absorbed by the optical switching layer.

13. The display apparatus of claim 1, wherein when the display apparatus operates in the reflection mode, only red light of the outdoor light incident on the third reflection type color filter of the second color filter layer is reflected, whereas light of other colors are transmitted through the third reflection type color filter and absorbed by the optical switching layer.

14. The display apparatus of claim 1, wherein when the display apparatus operates in the reflection mode, only green light of the outdoor light incident on the second reflection type color filter of the second color filter layer is reflected, whereas light of other colors are transmitted through the second reflection type color filter and absorbed by the optical switching layer.

15. The display apparatus of claim 1, wherein when the display apparatus operates in the reflection mode, a color light of the outdoor light incident on a reflection type color filter of a color filter layer is reflected, whereas light of other colors are transmitted through the reflection type color filter and absorbed by the optical switching layer.

16. A color filter device comprising:
a first color filter layer comprising a first arrangement of a first reflection type color filter, a second reflection type color filter, and a third reflection type color filter;
an optical switching layer disposed on the first color filter layer; and
a second color filter layer disposed on the optical switching layer, the second color filter layer comprising a second arrangement of the first reflection type color filter, the second reflection type color filter, and the third reflection type color filter,
wherein the color filter device is configured to switch between a transmission mode in which an image is formed by transmitting light provided by a light source and a reflection mode in which an image is formed by reflecting outdoor light, and the optical swtching layer is configured to switch between a transparent state so that the color filter device operates in the transmission mode and a black state so that the color filter device operates in the reflection mode wherein no light is transmitted, and
wherein a first surface of the first color filter layer and a first surface of the second color filter layer are in contact with the optical switching layer, and a second surface of the first color filter layer and a second surface of the second color filter layer are outer surfaces of the color filter device.

17. The color filter device of claim 16, further comprising pixels, wherein the reflection mode and the transmission mode are in a same area of the pixels.

18. The color filter device of claim 16, further comprising pixels having an undivided area.

19. The color filter device of claim 16, wherein the first arrangement differs from the second arrangement in the sequence of the first, second and third reflection type color filters.

20. A display apparatus comprising:
an optical shutter to transmit or block at least a part of light according to electric control;
a light source to provide the light to the optical shutter;
a reflection plate arranged under the optical shutter;
a color filter layer disposed between the optical shutter and the reflection plate,
wherein the color filter layer comprises:
a first color filter layer including a first arrangement of a first reflection type color filter, a second reflection type color filter, and a third reflection type color filter;
an optical switching layer disposed on the first color filter layer; and
a second color filter layer disposed on the optical switching layer, the second color filter layer including a second arrangement of the first reflection type color filter, the second reflection type color filter, and the third reflection type color filter, the second arrangement being different from the first arrangement in the sequence of the first, second and third reflection type color filters,
wherein the display apparatus is configured to switch between a transmission mode in which an image is formed by transmitting light provided by the light source and a reflection mode in which an image is formed by reflecting outdoor light, and the optical switching layer is configured to switch between a transparent state so that the display apparatus operates in the transmission mode by providing white light to the optical shutter and a black state so that the display apparatus operates in the reflection mode wherein the light source is turned off and no light is transmitted.

* * * * *